United States Patent
Nilsson et al.

(10) Patent No.: US 9,558,451 B2
(45) Date of Patent: Jan. 31, 2017

(54) ADAPTING PARAMETERS OF A CALL IN PROGRESS WITH A MODEL THAT PREDICTS CALL QUALITY

(71) Applicant: Microsoft Technology Licensing, LLC, Redmond, WA (US)

(72) Inventors: Mattias Nilsson, Sundbyberg (SE); Ando Saabas, Tallinn (EE); Renat Vafin, Tallinn (EE); Markus Vaalgamaa, Helsinki (FI); Adriana Dumitras, London (GB); Teele Tamme, Tallinn (EE); Andre Veski, Tallinn (EE)

(73) Assignee: Microsoft Technology Licensing, LLC, Redmond, WA (US)

( * ) Notice: Subject to any disclaimer, the term of this patent is extended or adjusted under 35 U.S.C. 154(b) by 394 days.

(21) Appl. No.: 14/199,752

(22) Filed: Mar. 6, 2014

(65) Prior Publication Data

US 2015/0142702 A1 May 21, 2015

(51) Int. Cl.
| | |
|---|---|
| *G06F 15/18* | (2006.01) |
| *G06N 5/04* | (2006.01) |
| *H04M 3/22* | (2006.01) |
| *H04L 29/06* | (2006.01) |
| *H04L 12/24* | (2006.01) |
| *G06N 99/00* | (2010.01) |
| *G06K 9/62* | (2006.01) |

(52) U.S. Cl.
CPC .............. *G06N 5/048* (2013.01); *H04L 41/00* (2013.01); *H04L 65/00* (2013.01); *H04M 3/2227* (2013.01); *G06K 9/6218* (2013.01); *G06N 99/005* (2013.01)

(58) Field of Classification Search
CPC . H04L 47/00; H04L 47/125; H04N 21/23418; H04N 21/44209; H04N 21/64723
USPC ...................................................... 706/12, 45
See application file for complete search history.

(56) References Cited

U.S. PATENT DOCUMENTS

| | | | |
|---|---|---|---|
| 2005/0182852 A1* | 8/2005 | Tinsley | H04L 47/10 709/238 |
| 2013/0148525 A1* | 6/2013 | Cuadra Sanchez | H04L 41/147 370/252 |
| 2015/0304709 A1* | 10/2015 | Zhang | H04N 21/44008 725/109 |

OTHER PUBLICATIONS

"A new standardized method for objectively measuring video quality", IEEE Transactions on Broadcasting, vol. 50, No. 3, pp. 312-322, 2004., Retrieved from: http://www.cs.sfu.ca/CourseCentral/820/li/material/source/papers/VQM-IEEE-Broadcasting-2004.pdf,Sep. 3, 2004, 11 Pages.

(Continued)

*Primary Examiner* — David Vincent
(74) *Attorney, Agent, or Firm* — Tom Wong; Micky Minhas (57) ABSTRACT

The disclosure relates to a communication client application for running on a user terminal to conduct calls over a network. The client is configured to access a model which models quality of user experience for calls based on a set of technical parameters of each call. The model itself is based on user feedback indicating subjective quality of multiple past calls as experienced by multiple users, modeled with respect to the technical parameters collected from each of the past calls. The model generates a predicted call quality score predicting the quality of user experience for the call given its technical parameters. Based on this process, one or more of the technical parameters of the call can be adapted to try to increase the quality experienced by the user.

20 Claims, 4 Drawing Sheets

(56) References Cited

OTHER PUBLICATIONS

"Comparison between subjective listening quality and P.862 PESQ score", Psytechnics, Retrieved from: http://www.sageinst.com/downloads/960B/wp_sub_v_pesq.pdf,Sep. 2003, 17 Pages.
"Objective perceptual multimedia video quality measurement in the presence of a full reference", Recommendation J.247 ITU-T, Retrieved from: http://www.ietf.org/mail-archive/web/rmcat/current/pdfliwye67a2T.pdf,Aug. 2008, 108 Pages, 2008.
"Objective perceptual multimedia video quality measurement of HDTV for digital cable television in the presence of a full reference", Recommendation J.341 ITU-T, Retrieved from: http://www.itu.int/rec/T-REC-J.341-201101-I/en,2008, 32 Pages, 2008.
"Opinion model for video-telephony applications", Recommendation G.1070 ITU-T, Retrieved from: http://www.itu.int/rec/T-REC-G.1070-201207-I,Jul. 2012, 30 Pages.
"Perceptual objective listening quality assessment", Recommendation P.863 ITU-T, Retrieved from: http://www.itu.int/rec/T-REC-P.863-201101-I,Jan. 2011, 76 Pages.
"The E-model: A Computational model for use in transmission planning", Recommendation G.107 ITU-T, Retrieved from: http://www.itu.int/rec/T-REC-G.107-201112-I/en,Dec. 2011, 26 Pages.
Bhat, et al.,' "A novel perceptual Quality Metric for Video Compression", Picture Coding Symposium, 2009, Retrieved from: http://65.54.113.239/PublicationList?srcType=2&desType=2&srcID=10276071&desID=22020876,2009, 4 Pages.
Brandao, et al.,' "From PSNR to perceived quality in H.264 encoded video sequences", Workshop of Quality of Experience for Multimedia Content Sharing, 2011, Retrieved from: http://www.it.pt/papconf_pdf_p.asp?ID_PaperConference=10565&id=3,2011, 4 Pages.
Breiman, "Random Forests", Machine Learning, vol. 45, pp. 5-32, 2001, Retrieved from: http://link.springer.com/article/10.1023%2FA%3A1010933404324,2001, 28 pages.
Duda, et al.,' "Pattern Classification", Section 2.8.3 John Wiley & Sons, 2001, 3 Pages.
Franklin, "The Elements of Statistical Learning", Springer Series in Statistics, Jun. 1, 2005, 5 Pages.
Gan, et al.,' "Data Clustering: Theory, Algorithms, and Applications", Section 9.1 SIAM, 2007, 4 Pages.
Gersho, et al.,' "Vector Quantization and Signal Compression", Part 3, Chapter 10. Kluwer Academic Publishers, 1992, 35 pages.
Joskowicz, et al.,' "A General Parametric Model for Perceptual Video Quality Estimation", Conference on Communications' Quality and Reliability, 2010, Retrieved from: http://iie.fing.edu.uy/~josej/docs/CQR010%20A%20General%20Parametric%20Model%20for%20Perceptual%20Video%20Quality%20Estimation.pdf,2010, 6 Pages.
Joskowicz, et al.,' "Combining the effects of frame rate, bit rate, display size and video content in a parametric video quality model", Latin America Networking Conference 2011, Retrieved from: http://iie.fing.edu.uy/publicaciones/2011/JL11/JL11.pdf,10/12- 13/2011, 8 Pages.

Joskowicz, et al.,' "Enhancements to the opinion model for video-telephony applications", Latin America Networking Conf., 2009, Retrieved from: http://www.researchgate.net/publication/221405941_Enhancements_to_the_opinion_model_for_video-telephony_applications,Sep. 24-25, 2009, 8 Pages.
Kay, "Fundamentals of Statistical Signal Processing—Estimation Theory", Chapter 4 Prentice Hall, 1993, 18 Pages.
Le et al.,' "Qualinet White Paper on Definitions of Quality of Experience", http://multimediacommunication.blogspot.com/2012/10/qualinet-white-paper-on-definitions-of.html, Jun. 3, 2012, 24 Pages.
Linde, et al.,' "An algorithm for vector quantizer design", IEEE Transactions on Communication, vol. 28, No. 1, pp. 84-95, 1980., Retrieved from: http://148.204.64.201/paginas%20anexas/voz/articulos%20interesantes/IEEE%20FOSR/32.pdf,Jan. 1980, 12 Pages.
Meinshausen, et al.,' "Stability Selection", Journal of the Royal Statistical Society: Series B (Statistical Methodology), vol. 72, No. 4, pp. 417-473, 2010., Retrieved from: http://onlinelibrary.wiley.com/doi/10.1111/j.1467-9868.2010.00740.x/abstract,2010, 57 Pages.
Narvekar, et al.,' "Extending G.1070 for Video Quality Monitoring", IEEE Conference on Multimedia and Expo., 2011, 2011, 4 Pages.
Richardson, "H.264/MPEG4 Part 10", H.264 and MPEG-4 Video Compression: Video Coding for Next-Generation Multimedia, John Wiley & Sons, Ltd., ISBN: 0-470-84837-5, Oct. 17, 2003, 12 pages.
Theodoridis, et al.,' "Pattern Recognition", Section 5.5 Academic Press, 1999, 8 Pages.
Vapnik, "The Nature of Statistical Learning Theory", Section 5.6 Springer, 1999, 9 Pages.
Waltermann, et al.,' "Extension of the E-model towards super-wideband speech transmission", IEEE Intl. Conf. on Acoustics, Speech, and Signal Processing, 2010., 2010, 4 Pages.
Wang, et al.,' "Image Quality Assessment: From Error Visibility to Structural Similarity", IEEE Transactions on Image Processing, vol. 13, No. 4, Apr. 2004, 14 pages.
Wang, et al.,' "Multi-Scale Structural Similarity for Image Quality Assessment", IEEE Asilomar Conf. Signals, Systems and Computers, 2003., Retrieved from: http://www.cns.nyu.edu/pub/eero/wang03b.pdf,2003, 5 Pages.
Wang, et al.,' "Rate-SSIM optimization for video coding", IEEE Intl. Conf. on Acoustics, Speech, and Signal Processing, 2011., Retrieved from: http://ir.pku.edu.cn/bitstream/211010/9671/1/Rate-SSIM_optimization_for_video_coding.pdf,2011, 4 pages.
Weiss, et al.,' "Modeling Call Quality for Time-Varying Transmission Characteristics Using Simulated Conversational Structures", ACUSTICA—acta acustica vol. 95 (2009) 1140-1151, 2009, 12 Pages.
"Second Written Opinion Issued in PCT Patent Application No. PCT/US2014/065108", Mailed Date: Oct. 22, 2015, 5 Pages.
"International Preliminary Report on Patentability Issued in PCT Application No. PCT/US2014/065108", Mailed Date: Feb. 3, 2016, 7 Pages.
"International Search Report and Written Opinion", Application No. PCT/US2014/065108, Feb. 16, 2015, 10 Pages.

\* cited by examiner

ADAPTING PARAMETERS OF A CALL IN PROGRESS WITH A MODEL THAT PREDICTS CALL QUALITY

RELATED APPLICATIONS

This application claims priority under 35 USC §119 or §365 to Great Britain Patent Application No. 1320216.3 entitled "Predicting Call Quality" filed Nov. 15, 2013 by Nilsson et al., the disclosure of which is incorporate in its entirety.

BACKGROUND

A communication system such as a VoIP system implemented over the Internet may be required to serve billions of calling minutes to people around the globe. Nowadays users expect a high quality calling experience. Meeting such high expectations depends on the communication system provider's ability to define, analyze, measure, improve and monitor call quality. This involves the ability to understand the impact and frequency of technical conditions (measured by technical parameters) on the user's subjective call experience; for instance an understanding of the network and media characteristics in categories such as transport quality, quality of service (QoS), quality of media (QoM) and quality of experience (QoE). There are various methods currently in use for objectively assessing media quality.

The simplest methods use basic engineering metrics such as the signal-to-noise ratio (SNR) commonly used in audio and the peak-signal-to-noise ratio (PSNR) used in video. These simple metrics can also be modified to take more account of perceived quality. For example, refinements to PSNR by adaptation to the spatio-temporal complexity of the video have been proposed, resulting in more correlation with human perception. An alternative to PSNR is the structural similarity index (SSIM) which has a higher correlation with subjective quality. Recent work in video coding has aimed at using SSIM as the encoding distortion measure.

The more advanced methods for audio and video quality assessment mimic the entire (and very complex) human hearing or visual system, and try to predict the mean user perceived quality measured by (for instance) mean opinion score (MOS). Examples of the most advanced models today are the speech quality tool in ITU-T P.863 (POLQA), and the video quality tools in ITU-T J.247 and J.341.

The objective test methodologies can be divided into three groups based on the inputs provided to the models: full, reduced and no reference models. This taxonomy takes into account whether a model uses the original audio or video signal as a reference for analysis.

In the full reference models (such as the aforementioned metrics PSNR, SSIM, POLQA) the original audio or video signal is compared to the processed (or so-called degraded) audio or video signal. Based on the comparison the model predicts the user perceived quality. The reduced reference models use only part of the original signal properties for quality assessment. Examples in this category of models include the standardized Video Quality Metric (VQM) designed for MPEG-2 quality assessment.

The no-reference models do not use the original audio or video signal to assess the quality. Instead, these models make assumptions about the properties of the original signal. Perhaps the most well-known no-reference model is the E-model (ITU-T G.107) designed for speech quality assessment. There is a recent extension of the E-model (ITU-T G.1070) that includes both video quality (coding, frame-rate, packet-loss, and display-resolution) and a combination of the audio and video quality (delay and sync) into a total quality score. The audio part in G.1070 is a simplified version of the G.107 model. Both of these models were designed to assist the telecom operators in their network infrastructure design so as to guarantee a specific level of quality. The G.107 E-model has been extended from narrow and wideband usage towards super-wideband usage, supporting the modern speech codecs such as Silk. Further refinements of the G.1070 model also take into account the video content, for instance the spatio-temporal complexity.

SUMMARY

These existing models have only previously been used as a tool for offline analysis to provide information to developers and operators, e.g. to analyze the performance of a codec at the design stage before it is released to the public. In the present disclosure on the other hand, there is provided a model which takes user feedback scores from real calls, models these in relation to objective technical parameters of the calls, and then dynamically outputs the results back into the system in order to adapt further calls. This use of the results is said to be dynamic in that it goes on automatically "in the field", after the system has been deployed and is in live, real-life operation. The model receives technical parameters of a call currently being conducted by the client running on a user terminal, and in response issues information used to automatically adapt the call.

According to one aspect disclosed herein, there is provided a communication client application for running on a user terminal such as a desktop or laptop computer, tablet or smart phone in order to conduct one or more calls over a network, e.g. a VoIP call over the Internet (which may include video). The communication client is configured to access a model which models quality of user experience for calls based on a set of technical parameters of each call. For example the technical parameters could be measurements of properties such as echo, noise, packet round-trip time, received bandwidth, resolution or frame rate. In embodiments the model is hosted on a server (comprising one or more server units across one or more sites), and accessed by the client over the network. However, it is also possible that the user terminal may be provided with an instance of the model locally, or that the model could be implemented over a peer-to-peer distributed network.

The model itself is based on user feedback indicating the subjective quality of multiple past calls as experienced by multiple users, modeled with respect to the technical parameters collected from each of the past calls. The user feedback may take the form of user feedback scores rating the subjective quality of the calls as experienced by the users. Thus the model is able to define an objective metric predicting the quality of user experience, based on an association between objective technical parameters and subjective user feedback scores. The user feedback scores may for example rate the score out of five, e.g. the user giving the call one to five stars. The predicted score may attempt to predict the call quality on this same scale, e.g. the mean opinion score (MOS) comprising a discrete or continuous value between one and five, or alternatively the predicted score may be output in a different form, e.g. categorising calls into two categories corresponding to "good" and "bad" calls. Generally any scale for user feedback may be used.

When a call is made, the model obtains the technical parameters of the call by receiving measurements from the receive side and/or transmit side (and/or if the call is hosted via the server it could perform some or all of the measurements itself). In response, this causes the model to generate a predicted call quality score predicting the quality of user experience for the current call based on the application of the model to the technical parameters of the call in question. Based on this predicted call quality score, the model also determines whether an adaptation of the call could increase the predicted quality of user experience, i.e. by adapting one or more technical parameters of the call. It returns an indication of any determined adaptation to the client application on at least one end of the call, which uses this indication to adapt the one or more of the technical parameters of the call accordingly. Alternatively it is possible that the model returns the predicted score itself which the client could use to experiment with adjusting one or more technical parameters (potentially referring back to the model again to see how changes are affecting the predicted quality). Either way, the current call is thus adapted based on the generation of the predicted quality score by the model.

In embodiments, the model may be based on the technical parameters and one or more model parameters of the model itself, and the model may be based on a training of the model parameters by a training algorithm.

Furthermore, in embodiments not only may the calls be adapted dynamically, but calls may be used to obtain further user feedback so as to dynamically adapt the model itself. That is, the model may be automatically adapted in a live fashion, as feedback on calls is collected during real-life system operation or "in the field" (as opposed to just being pre-configured based on a set of prior training or test data).

Hence according to a further aspect disclosed herein, there may be provided a server comprising the model and a network interface arranged to receive further user feedback scores rating the subjective quality of a plurality of further calls from a plurality of users, and to obtain the technical parameters of the further calls. In this aspect the model is configured to dynamically incorporate the user feedback scores and the technical parameters of the further calls and thereby dynamically adapt the model as the further user feedback scores are received.

In embodiments, the communication client may be configured to receive a user feedback score for the adapted call from a user of the user terminal, and to submit this user feedback score to the model where it is incorporated along with the technical parameters of the respective call in order to adapt the model. When the communication client then later conducts a second call over the network, the model generates a predicted call quality score predicting the quality of user experience for the second call based on the adapted model as applied to the technical parameters of the second call. Thus the second call can be adapted based on the prediction by the adapted model, in the same way the first call was adapted based on the prediction by the previous version of the model.

In embodiments, the process may continue in this way over many calls conducted between many users: i.e. adapting calls, receiving user feedback on the adapted calls to adapt the model, then adapting further calls based on the adapted model, receiving user feedback on the further calls to further adapt the model, then using this version of the model to adapt yet further calls, and so forth; with all this being performed automatically in the field, dynamically in an ongoing fashion during live system operation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The claimed subject matter is also not limited to implementations that solve any or all of the particular disadvantages or provide any of the particular disadvantages noted herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Figure 1:
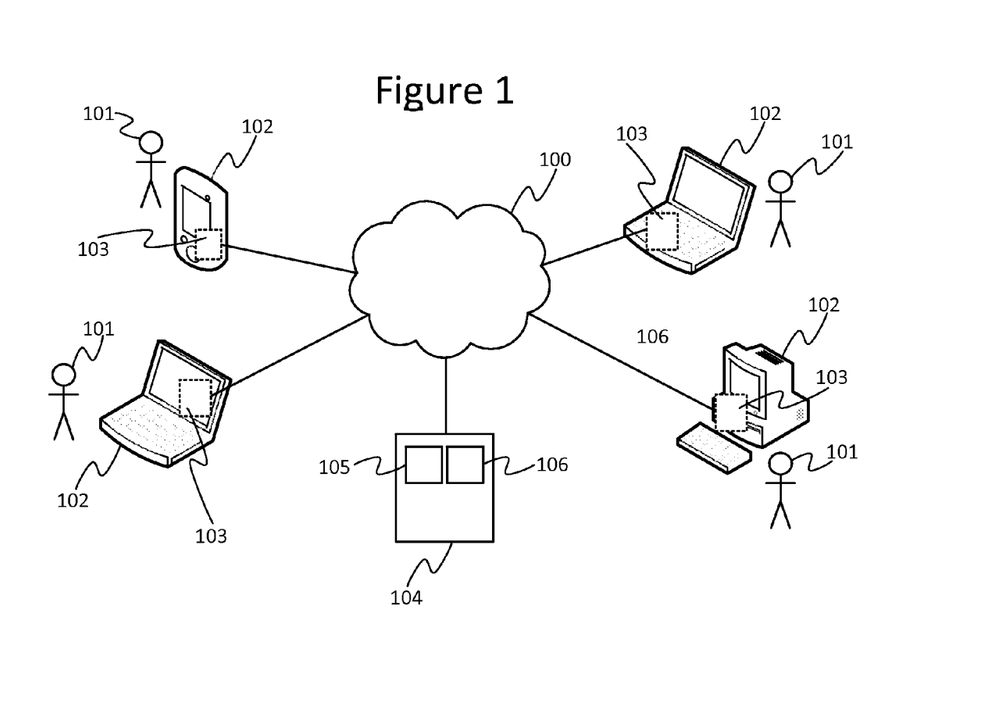
FIG. 1 is a schematic block diagram of a communication system.

FIG. 1 shows an example of a communication system in accordance with embodiments disclosed herein. The communication system comprises a plurality of user terminals 102 connected to or being operable to connect to a network 100, in embodiments a packet-based network such as the Internet. Each user terminal 102 is used by a respective user 101. Each user terminal 102 is installed with a respective instance of a communication client application 103 for conducting calls with other user terminals over the network, e.g. a VoIP client. A call is a live, real-time communication between two or more user terminals, comprising media content of one or more media types including at least an audio stream, video stream or both. It is also possible that the call includes one or more other types of media such as a screen sharing stream.

The communication system further comprises a server 104 connected to the network 100. The server 104 may be owned and/or operated by a provider of the communication system in question, e.g. a VoIP provider, or by a third party provider operating in conjunction with one or more such communication providers. Note that the term server as used herein does not necessarily limit to a single server unit or a single physical site. The server 104 comprises a network interface 105 arranged for communicating with the client applications 103 of the user terminals 102 over the network 100. The server 104 is also arranged to run a call quality prediction model 106. Each client 103 is operable to access the model 106 via the network 100 and interface 105. Alternatively or additionally, an instance of the model 106 may be provided locally on one or more of the user terminals 102, e.g. being incorporated into the client 103 or provided as an accompanying application such as a plug-in.

The model 106 is configured to automate call quality monitoring, based on an objective call quality metric which is able to closely approximate the subjective call quality; and to predict the objective call quality using technical parameters and the objective quality metric. It provides an online (during the call) call quality predictor that runs on the server 104 or in the client 103, in order to identify possible technical trade-offs and/or other actionable items during a call (e.g. to trade off video frame rate vs. resolution or to make a microphone selection).

Feature Selection

The analysis of call quality may be considered in terms of quality of experience (QoE). One definition of QoE proposal by the European Network on Quality of Experience in Multimedia Systems and Services (Qualinet) is as follows: "QoE is the degree of delight or annoyance of the user of an application or service. It results from the fulfillment of his or her expectations with respect to the utility and/or enjoyment of the application or service in the light of the user's personality and current state". For the communication system of FIG. 1, this definition means that QoE is the overall experience of a user 101 when using the client 103 to conduct a call.

Figure 2:
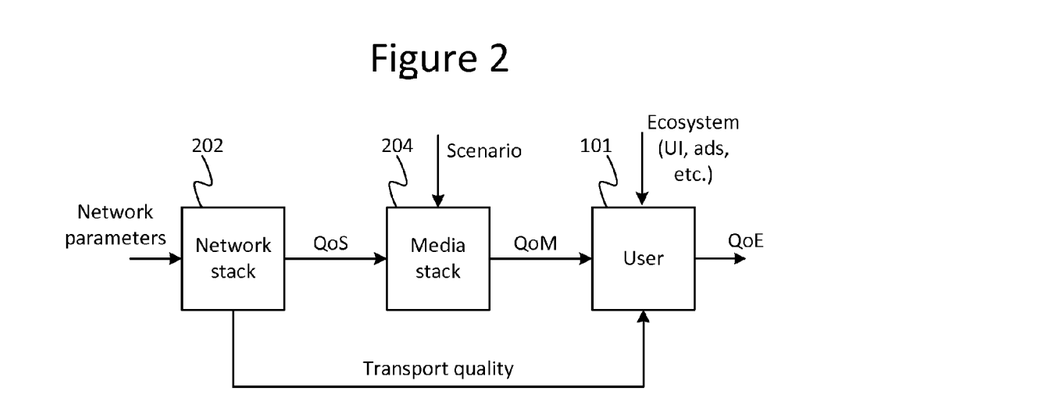
FIG. 2 is a schematic representation of a user's quality of experience.

FIG. 2 gives a high-level representation of the relationships between call quality and call reliability components. In embodiments modeling the QoE may involve modeling the QoE of the media stream(s) (QoM) and the transport quality. This means that, even though call quality and call reliability are often studied separately, call quality in fact depends on the call reliability.

Various observable network parameters contribute towards the quality of service (QoS) delivered to the media streams. In turn, the QoS, scenario and media stack determine the QoE of the media streams (QoM). For example the set of observable network parameters may comprise one-way network delay, packet loss, available bandwidth, and/or conversational delay. The scenario may comprise visual and/or acoustic parameters of the environment from which the call media is captured, and/or the choice of device(s) capturing the call media (such as a web camera, microphone, etc.). QoS is closely connected to the particular use case or application, which in this disclosure comprises real-time audio and/or video communication.

Various observable network parameters also impact the transport quality, these being parameters that reflect the call reliability. Although not related to media processing, as mentioned the transport quality has an impact on the subjective call quality. For instance, transport properties such as call setup time and number of call drops may have an impact on a user's experience of quality.

The QoM and transport quality combine to give the overall QoE. The QoM is the QoE of the media and is affected by various media parameters. For example parameters affecting audio QoM can include parameters relating to the environment or capture, such as: speech level, noise, echo, room reverberation, and/or microphone frequency response. Parameters affecting video QoM can also include parameters relating to the environment (scene) and capture, such as: noise (particularly when capturing in low light), brightness, contrast, colour, and/or parameters measuring properties of the captured video content (e.g. texture, motion, and/or identification of a face in the video versus other objects). Parameters affecting audio QoM can include parameters relating to encoding and decoding such as: audio frequency range (especially if the frequency range is relatively limited compared to the desired content, e.g. speech), processing distortions and muting, coding distortions, concealment distortions (e.g. time-scale speech modifications and/or speech extrapolations), delay, and/or one or more parameters measuring problems with synchronising with the video. Parameters affecting video QoM can also include parameters relating to encoding and decoding, such as: blockiness, ringing, a measurement of false edges, jerkiness, frame rate, freezes (at loss), delay, and/or one or more parameters measuring problems with synchronising with the audio. Parameters affecting audio QoM can include parameters relating to the rendering, such as loudspeaker frequency response, loudness and/or noise. Parameters affecting video QoM can also include parameters relating to rendering, such as display size, resolution and viewing distance.

To model quality, a particular set of objective technical parameters is to be chosen to represent each call. The authors of the present disclosure have in fact identified up to 1800 possible parameters which can be used to describe a call, but to implement a practical model these will be narrowed down to a manageable set, e.g. to a set of somewhere between 3 and 150 parameters. In embodiments the set is no more than 40 parameters. There is no one right answer as to which parameters to choose, but they may be chosen to reflect a variety of diverse aspects of a call while also providing a balance between complexity and how representative the set is of the call.

In embodiments, the set of technical parameters describing each call may comprise: one or more parameters relating to an environment from which the call is being captured, one or more parameters relating to capture of call media of the call one or more parameters relating to media content of the call, one or more parameters relating to encoding and/or decoding of the call, one or more parameters relating to quality of service for the call over the network, one or more parameters relating to rendering of call media of the call, and/or one or more parameters relating to processing resources of a transmitting and/or receiving terminal of the call. The set of technical parameters may comprise one or more parameters relating to video of the call, and/or one or more parameters relating to audio of the call.

In embodiments, the set of technical parameters may comprise parameters from one or more of the categories: network features (e.g. network delay, bandwidth, network interface type); audio features (e.g. echo, noise, concealment usage); and video features (e.g. resolution, frame rate). Other possible parameters may include the version of the client, an indication of the codec, and/or transport stream type (which may have possible values such as: UDP, UDP relay, TCP and TCP relay).

In embodiments, the set of technical parameters may be chosen based on an assumption that QoE≈QoM. By making this assumption, the model does not explicitly take into account the impact of the transport quality on the QoE. In embodiments, the model may eliminate the impact of the transport quality (to some extent at least) by only using data that corresponds to successfully established calls and calls without drops. However, it is not excluded that in other embodiments the set may comprise one or more parameters relating to transport quality (reliability).

Some example parameters are set out below. A suitable set may be constructed from any combination of some or all such parameters, and/or other parameters.

Render frame rate (receive side)
Frame rate of encoded stream (other side)
Frame freeze time—i.e. delay between the video frames (receive side)
Transmit, receive or overall bandwidth
Bandwidth manager video overshoot (other side)
Bandwidth manager audio stability (other side)
Speaker change rate—e.g. speaker change frame percentage (both sides)
Echo—e.g. echo delay or echo to near-end ratio (both sides)
Receive packet loss (receive side)
Round trip time
Resolution of encoded stream, play-out or display
Audio jitter buffer delay (receive side)
Audio jitter buffer extrapolation ratio (receive side)
Sent frame rate (other side)
Echo to near end ratio (both sides)
Sent bitrate (both sides)

Doubletalk frame percentage
Overload frame percentage
Transport protocol

Some more detailed examples listed by category with example units are:

| Category | Parameter | Unit | Measuring side |
|---|---|---|---|
| Audio (echo/microphone) | Echo delay | ms | Far-end (transmit) |
| | Ratio between echo and near-end speech | dB | Far-end |
| | Percentage of frames with overloaded microphone signal | % | Far-end |
| Audio (speech/noise levels) | Analogue gain control (AGC) gain | % | Far-end |
| | Speech level in a frequency band n | dB | Far-end |
| | Speech level averaged over a plurality of frequency bands, e.g. using A-weighting | dB | Far-end |
| | Variation of noise level in a frequency band m | dB | Far-end |
| | Noise level averaged over a plurality of frequency bands, e.g. using A-weighting | dB | Far-end |
| Audio codec | Audio bit rate | bytes/s | Far-end |
| Audio conversation | Speaker change rate | % | Near-end (receive) |
| | Activity of far-end speaker | % | Near-end |
| Video content | Luminance | — | Far-end |
| | Global motion vector magnitude | — | Far-end |
| | Average of motion vector magnitudes within frame | — | Far-end |
| | Texture complexity | — | Far-end |
| | Shakiness | — | Far-end |
| | Quantization parameter (QP) | — | Far-end |
| Video sent | Sent bit rate | kbits/s | Far-end |
| | Sent frame rate | frames/s | Far-end |
| | Stream resolution (dim X) | # pixels | Far-end |
| | Stream resolution (dim Y) | # pixels | Far-end |
| Video received | Received bit rate | kbits/s | Near-end |
| Video rendering | Rendered frame rate | frames/s | Near-end |
| | Rendered resolution (dim X) | # pixels | Near-end |
| | Rendered resolution (dim Y) | # pixels | Near-end |
| | Delay between video frames (freeze) | # frames | Near-end |
| Network | Packet loss | % | Near-end |
| | Audio extrapolation ratio (in loss and jitter concealment) | % | Near-end |
| | Audio interpolation ratio (in loss and jitter concealment) | % | Near-end |
| | Audio timescale modification ratio (in loss and jitter concealment) | % | Near-end |
| | Audio end-to-end delay | ms | Average of both |
| Bandwidth manager | Audio bandwidth allocation stability | — | Far-end |
| | Video bandwidth allocation stability | — | Far-end |
| | Video bandwidth overshoot | % | Far-end |
| CPU load | CPU load by VoIP client application | % | Near-end |

Note that in general the technical parameters can be values sampled throughout the call at any suitable granularity, and/or can be aggregated parameters aggregated over some or all of a call (e.g. being determined at the end of the call). Any of the above parameters may for example be evaluated in terms of any suitable point estimate such as instantaneous value, maximum, minimum, mean, median, mode, variance and/or standard deviation.

Opinion Scores

In addition to defining a set of technical parameters, the provider gathers feedback of multiple past calls. The client application 103 is configured to provide its respective user 101 with a prompt for a user feedback score at some point during or just after a call, and in response to the user entering the feedback into the client 103 it submits this to the model 106.

Figure 3:
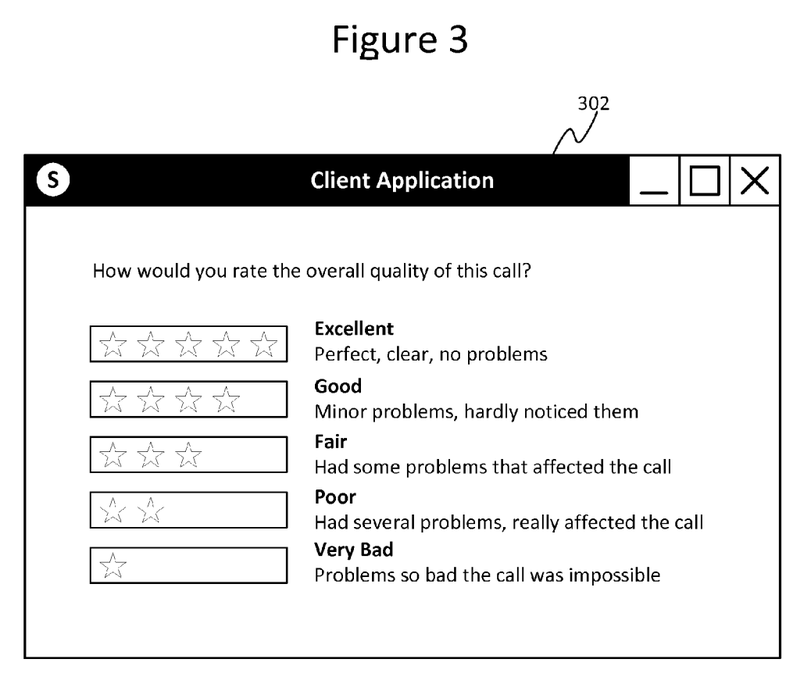
FIG. 3 is a schematic representation of a user interface for giving user feedback.

FIG. 3 illustrates an example of a graphical prompt for user feedback, in the form of a screen or window 302 of the client 103. In this example, the user is prompted to rate the call from one to five stars. Thus the feedback scores as represented in the model 106 may be integer values from the set $\{1, 2, 3, 4, 5\}$. However, other subjective scoring metrics and scales are also possible.

The model 106 collects the user feedback scores from multiple past calls and stores these in a database. It also collects the technical parameters as measured for each respective call, and stores these in the database in association with the respective user feedback score. The role of the model 106 is then to provide an association between the objective technical parameters and the subjective user feedback scores so that, once a sufficiently large number of past calls has been incorporated into the model, then for a subsequent call the subjective quality of the user's experience can be predicted in a quantified manner (with some reasonable degree of accuracy) based on its objective technical parameters. If it is desired to assess the accuracy, this can be computed with any suitable statistical measure, for example (but not limited to) root-mean-square error, mean absolute error and/or coefficient of determination (for predicting a continuous variable) or rate of correct classification, a receiver operating characteristics (ROC) curve, and/or confusion matrix (for predicting a discrete score).

The predicted score may be on the same scale as the user feedback scores, e.g. a score from 1 to 5 (potentially with the possibility of non-integer predictions as in the case of MOS, e.g. 3.9, even if the user feedback was from a set of integers). Alternatively the predicted score could be on a different scale, e.g. a percentage, or categorised into one of only two possible predicted scores intended to be interpreted as "good" and "bad" or "acceptable quality" and "unacceptable quality".

Partitioning the Feature Space

Figure 4:
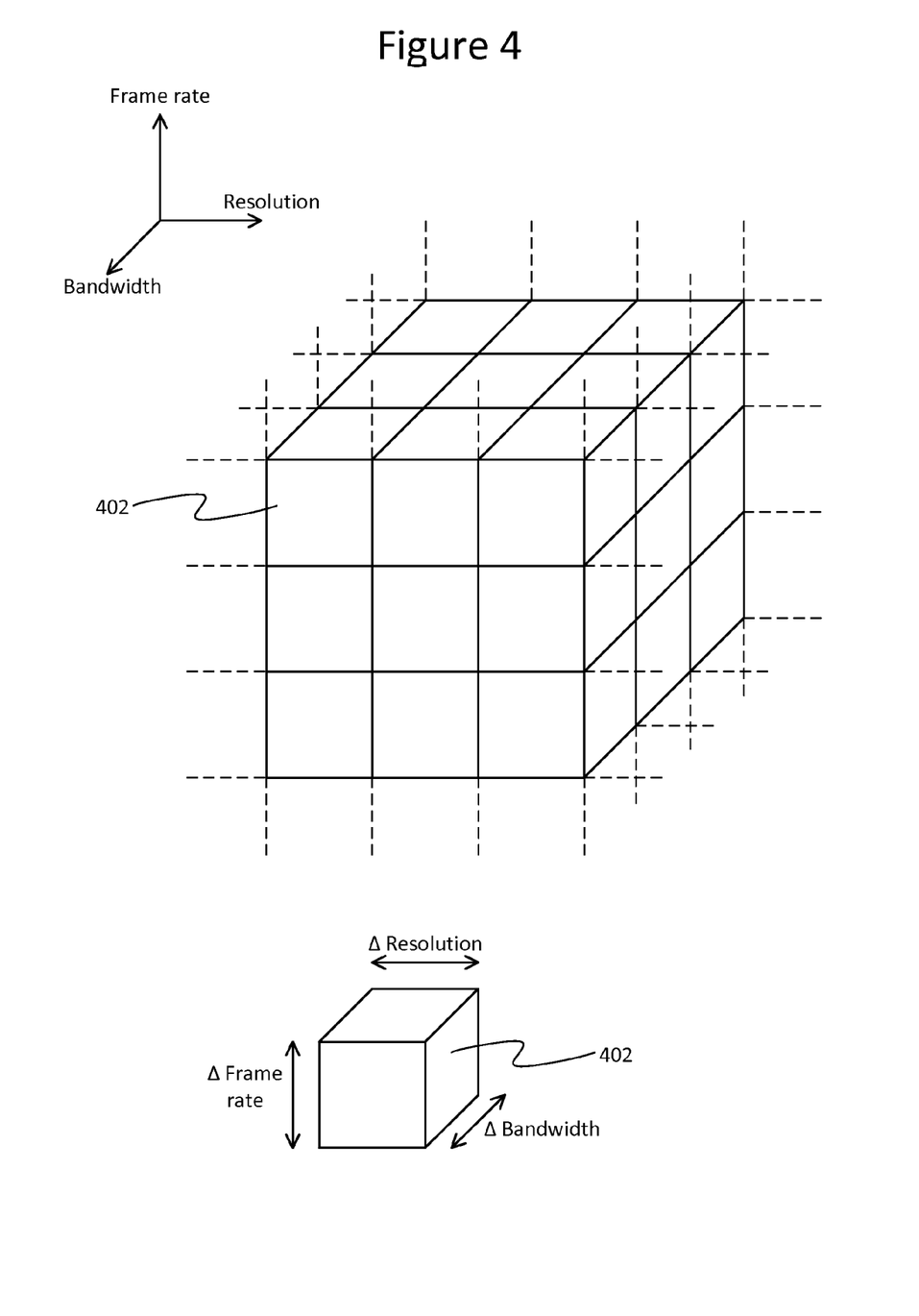
FIG. 4 is a schematic representation of clustering technical parameters in a feature space.

Referring to FIG. 4, the set of parameters that is measured and stored for each call defines a multi-dimensional feature space. A given call may be described by a feature vector in the feature space, i.e. a vector comprising the values of the set of technical parameters for that call. The model 106 may involve a partitioning of the feature space to make the processing of the data more manageable in terms of complexity. This may be referred to as clustering, in that the sampled parameters are clustered into multi-dimensional clusters or cells 402. Put another way, the feature space is quantized in each of its multiple dimensions. By way of illustration, FIG. 4 shows only a three-dimensional feature space defined by a set of three technical parameters (frame rate, resolution and bandwidth) but it will be appreciated that the same principle may be applied to any parameter set of any number of dimensions. Note also the cells don't necessarily have to be box shaped (nor multi-dimensional box shaped in any number of dimensions)—this is just an example.

In order to select the number of clusters such that it provides both (a) a good balance between an adequate representation of relevant technical conditions, and (b) proper averaging, ease of analysis and low complexity, the partitions may be created such that calls in a cell 402 are as similar to each other as possible from a technical standpoint, while the cells 402 themselves are as different from each other as possible. In other words, it may be desired to minimize the within-cell variance while maximizing between-cell variance. It may also be desirable to be able to select the number of clusters 402 and use simple metrics to evaluate the quality of the resulting clusters. Whilst finding an absolutely optimal partitioning for a dataset of a large size and dimensionality may not be practical, there are a number of clustering algorithms with good heuristics for such cluster creation. Some examples of clustering algorithms are outlined below—clustering by Cartesian product, and vector quantization (VQ).

Clustering by Cartesian product: one approach to partition the feature space is to simply divide individual technical feature ranges into intervals and then create the clusters by combining these intervals. For instance, if the frame rate range is divided into three intervals (e.g. 0-10, 11-20 and 21-30 fps) and the bandwidth range into two intervals (e.g. 0-200 and 200+ kbps), then six subsets (clusters) are obtained by combining the two sets of intervals.

This approach is similar to a typical real-life partitioning scenario, where user preferences are to be evaluated for certain types of calls (for example by evaluating which combination of frame rate and resolution is optimal for a given bandwidth from the user's point of view). Since the number of subsets grows exponentially with the number of features (with 40 features and 10 intervals for each, there would be have $10^{40}$ subsets), a smaller number of representative features and/or intervals may have to be selected. For example six features may be selected (a set of six technical parameters), dividing each into eight intervals. Even in this case, combining all of them may be impractical, since it creates $8^6=260000$ distinct clusters. Therefore three or four element combinations of features (technical parameters) and their intervals may be used. This way, the total number of clusters is still reasonable, while covering a large number of different degradations.

Clustering by vector quantization (VQ): another approach to partitioning the input feature space makes use of VQ algorithms, several of which obtain the optimal partition regions and centroids by applying a training algorithm to a training set. Two commonly used clustering algorithms are k-means and Linde-Buzo-Gray (LBG).

The k-means algorithm (also called Lloyd's algorithm) is commonly used in data clustering. It is an iterative algorithm, where each iteration consists of first optimizing k partition regions given k centroids, and then optimizing k centroids given k partition regions. The iterations (called Lloyd iterations) continue until a convergence criterion is met. The performance of the algorithm depends on the choice of the initial k centroids. One commonly used variation is referred to as k-means++. In this algorithm, the initial centroids are selected such that they are well spread in the input space.

The LBG algorithm, which is well known in data compression, is also based on Lloyd iterations. In this algorithm, the selection of the initial centroids is different. The algorithm starts with one centroid and then splits it into two. It then applies Lloyd iterations to optimize the two centroids. It then splits the two centroids into four and optimizes the four centroids. The algorithm continues in this fashion until k centroids are obtained and optimized.

The Model

The model 106 itself is to be chosen for modeling the relationship between the technical parameters of calls (the feature vector) and the predicted call quality score. The model 106 is initially trained based on the multiple past calls used as training data, then deployed for making live predictions about further calls. In embodiments the model operates based on the feature space as defined and/or quantized in accordance with techniques such as those discussed above.

Let $x_i \in X$ denote a feature vector defining a technical state in the space of possible technical configurations. Assuming that the feature vector truly represents the technical condition that users are experiencing, each user will map the objective technical QoM to a subjective experience (opinion) score $y_i$, e.g. $x_i \rightarrow y_i \in [1, 2, 3, 4, 5]$. The mean opinion score (MOS) may be defined as an objective measure of the same QoM, $$MOS = \bar{y}_{x_i} = E[Y|X=x_i].$$

The prediction may be implemented based on the following approximations. Firstly, the measured (objective) user scores of individual calls that exhibit very similar technical parameters will (likely) be very similar. Secondly, the predicted (objective) mean opinion score of a group of calls with very similar technical parameters is taken as representative of the respective group of calls, and is equal to the expected score $\bar{y}_{x_i}$. Thirdly, when computed over a sufficiently large number of calls, the predicted (objective) mean opinion score will give a reasonable prediction on average over a large number of users (even if not for any one individual user).

Figure 5:
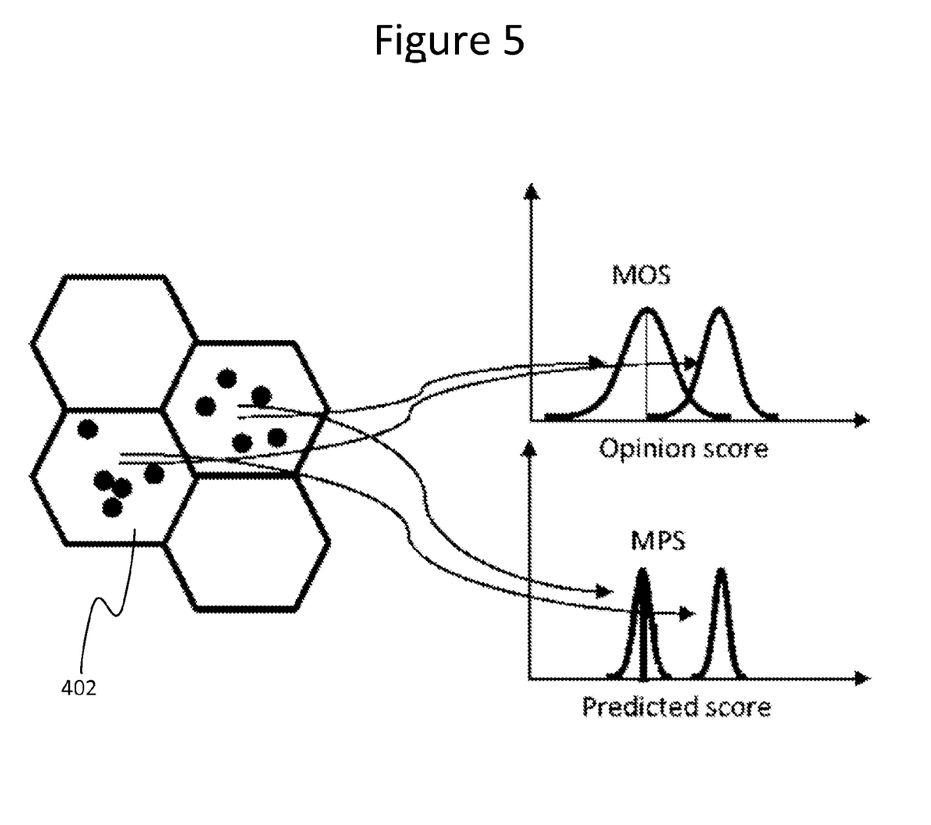
FIG. 5 is a schematic representation of the clustering of technical parameters in feature space, and prediction of call quality from a model based on such clustering.

The space of possible technical configurations is partitioned into clusters with similar objective technical conditions, which in turn lead to similar objective QoM. For example the centroid of a cluster n may be denoted by $c_n$ and the corresponding Voronoi region by $V_n$, and the predicted MOS given a similar objective QoM may then be expressed as
$\bar{y}_{Vn} = E[Y|x \in V_n]$. The performance of a quality predictor can be measured by comparing the mean predicted score (MPS) in each cluster with the actual mean opinion score (MOS) in each cluster (computed as the mean of the user individual scores). The MPS can be expected to match closely with the MOS, as illustrated in FIG. 5.

The inputs to the model 106 are the feature vectors extracted from the available data set (i.e. the measurements of the set of technical parameters for each call). The output is a predicted opinion score, describing the predicted quality of a call with the given technical conditions. In embodiments this may for example be a continuous value between 1 and 5 (the mean predicted score MPS) or a categorisation into "good" or "bad" call. The relations between the inputs and the output are defined by a mapping function, which depends on a set of model parameters. The function is initially trained based on a set of training data, i.e. using the technical parameters and user feedback scores of multiple past calls to provide training inputs. In training the goal is to find the model parameters that minimize the prediction error on the training data. Once trained to a suitable degree, the model 106 is then deployed into the field for making live predictions about current calls. In deployment the model 106 may be hosted on a server 104 accessible by clients 103 over the network 100, or alternatively an instance of the model could be provided in a new release of the clients 103 themselves.

In embodiments, the mapping function may for example be based on one of the techniques: Random Forest (RF), Linear Regression (LR) or Vector Quantization (VQ).

Random Forest: this is an ensemble learning method for classification and regression, which is based on constructing multiple decision trees, and taking their average (or mode in case of classification) as the final prediction. Random Forest is one of the most powerful learning methods, due to its ability to learn non-linear relationships and being robust to features in different scales.

Linear regression: this is a modeling approach where the dependent variable $y_i$ (here the predicted opinion score, e.g. predicted mean opinion score) is modeled as a linear combination of the predictor variables $x_{1i}, \ldots, x_{ni}$ (here the technical features of the call): $y_i = b_0 + b_1 x_{1i} + \ldots + b_n x_{ni}$. The vector $b_i$ comprises the unknown model coefficients to be learned. Linear regression can be extended to model non-linear relationships, using arbitrary non-linear functions on individual predictor variables. For example in polynomial regression, the relationship between the dependent and predictor variables is modeled as an $n^{th}$ order polynomial. The model is still linear in terms of the unknowns (coefficients to be learned) and can be effectively computed.

Vector quantization: this is commonly used in data compression. It partitions an input space into regions, and associates a representation point with each region. The representation points are commonly referred to as centroids, since they are chosen to best approximate all points in their respective regions according to a predefined measure. Each point is described by a vector containing $N \geq 1$ values, where N is called the vector dimension.

To apply VQ to objective mean opinion score prediction, first a vector quantizer is trained. The vector quantizer comprises partition regions and centroids. It is trained using N-dimensional feature vectors of technical parameters, each of which corresponds to a call in the training set. Next, the MOS of each region (cluster) is computed as the mean value of the subjective user scores assigned to the calls from the training set, which were quantized to the respective centroid of the cluster. As a result, each cluster is represented by a single MOS value. The predicted (objective) score for the call is the MOS value that represents the respective cluster. Note that, with this method all calls that are quantized to the same centroid have the same predicted (objective) score value.

Live Prediction & Adaptation

Once the model 106 is deployed then a communication client application 103 running on a user terminal 102 of the system is able to access the model 106, invoking it to determine a predicted call quality for a current call currently being conducted by the client 103 over the network 100 (i.e. to make a prediction while the call is still ongoing). As mentioned, in embodiments the model 106 is hosted on a server 104 and accessed via the network 100.

When it receives an access request from the client 103 of one of the user terminals 102, the model 106 obtains the respective measurements of the set technical parameters (i.e. the feature vector). This may comprise receiving the measurements from the client 103 making the request, i.e. the receiving end; or from a client 103 on the other end of the call, i.e. the transmitting end; or may comprise taking one or more measurements at the server 104 if it is an intermediary of any aspect of the call; or any combination of these possibilities. Note that the call may be described herein as having a transmitting and receiving end. Of course call media may travel in both directions, but for the purposes of the present discussion the receiving end of the call refers to the client 103 or terminal 102 of the user 101 for whom the quality of user experience is to be predicted, and the transmitting end refers to the client 103 or terminal 102 transmitting the call media of which the experience is to be predicted.

The model 106 then inputs the measurements of the technical parameters (the feature vector) for the current call into the mapping function of the model, which has already been trained to a working degree by the training data prior to deployment. The model 106 thus outputs a predicted opinion score for the current call based on the input parameters of the current call (the feature vector) and the trained function of the model being applied to those input parameters in order to generate the output. The predicted score could just be returned to the client application 103 to provide information to the user 101. However, according to the present disclosure it can alternatively or additionally be used to adapt the current call while it is still ongoing.

In embodiments this may be performed by determining an adaptation at the model 106 as hosted on the server 104, then returning an indication of the adaptation to the client application 103 on the transmitting and/or receiving user terminal 102 where the respective client 103 acts on the indication to adapt the call. The adaptation comprises adapting the value(s) of one or more of the set of technical parameters of the call. For example, it may be determined that for a given bitrate achievable over the network 100, a better quality of user experience can be achieved in the call video by trading off frame rate for frame resolution or vice versa. If so, the server 104 returns an indication of an increase and decrease in these properties respectively, or target values of these, to the transmitting client 103 and/or to the receiving client 103 (which may in turn make a request to the transmitting client) so that the encoded frame rate and resolution can be adjusted accordingly while the call is still going on. Note that where a change is made at the transmitting side, the receiving side may also have to adapt to the new parameter(s) of the received stream, e.g. if the transmitter adapts the frame rate and resolution at which it encodes then the receiver will adapt the frame rate and resolution at which it decodes.

In alternative embodiments, the model 106 could be implemented locally on each of one or more of the user terminal 102, e.g. incorporated into a version of the client application 103. Similar principles apply in relation to adapting the call, except that no signalling is necessarily required between server 104 and client 103.

There are a number of ways the model 106 may be implemented to determine the adjustment or target values to indicate to the client 103. For example, the model 106 may examine neighbouring cells (clusters) 402 or cells within a predetermined distance in the feature space of the cell describing the current call, to check whether any would give a higher predicted score—in effect it looks at alternative candidate values of the call's technical parameters where the candidate values extend within a certain range of the current values in one or more directions of the multidimensional quantized feature space. If it finds any values that would increase the predicted score it signals a corresponding adjustment to the relevant client 103 (possibly subject to a minimum threshold to avoid rapid switching or signalling in response to trivial variations). Another possibility would be to try a random selection of alternative, candidate parameter values (alternative cells in the feature space), to check whether any would give a better score. Another alternative would be to implement an analytical or empirically determined algorithm to determine the path or jump to a higher score from any given point in the feature space.

In embodiments, the model 106 may be configured to only attempt to find an adaptation on condition that the current predicted score for the call is below a threshold or categorised as "bad", and may stop once an adaptation has been found which raises the predicted quality to an acceptable level. Alternatively the search for adaptations could be an unconditional and/or continual process that is applied to throughout the call and/or regardless of its current predicted quality.

The above has described how a call may be adapted dynamically based on a model modeling the relationship between objective call parameters and quality of user experience. Furthermore, where the model 106 is hosted in a live fashion on a server 104, the model 106 itself need not remain static after the initial training and deployment. Rather, the model 106 can continue to be trained dynamically "in the field" based on ongoing feedback from users. When a user conducts a subsequent call (after deployment) then the feedback he or she provides is not just stored for offline analysis by an operator or developer, but automatically incorporated into the live model 106 along with the respective measurements of the technical parameters for the respective call. That is, the new feedback and parameters are incorporated into the training data, so that the training set itself becomes a dynamic entity. When a client requests a quality prediction for a second subsequent call, it will then be based on the currently adapted model including the feedback from the first subsequent call, and so forth. Such feedback will be continually submitted from many users across the globe, so that the accuracy of the model 106 continues to grow automatically with use of the system.

In addition, as well as being for adapting calls, the dynamically updated model may be accessed for offline prediction or analysis. For example, a developer of a VoIP client may use the most up-to-date model—as currently updated based on the most recent ongoing feedback from real users—in order to analyze the performance of a planned new release of the VoIP client. In another possible application, the dynamically updated model may be used for live monitoring and/or diagnostic applications in testing systems. For example, a monitoring or diagnostic application run by a communication provider may continuously monitor the system and automatically raise an alarm if there is an abnormal decrease of the predicted score.

Note again that the server 104 does not necessarily comprise one server unit—in embodiments it may be implemented over many server units networked together across many sites. Wherever a server is mentioned herein, one may read "the cloud" as an embodiment of this.

Accommodating User Bias & Random Scoring

The QoE, QoS and QoM previously discussed in relation FIG. 2 do not necessarily always give the full picture. In practice there may be more factors—user expectation, mood and/or other non-call related factors (e.g. UI and/or brand) may also play a part. That is, there may be user-related tendencies that contribute to the perceived experience of the user component 101 in FIG. 2, or at least to the feedback given by that user 101. For example some users have different expectations as to what is a "good" call, while there may also be users who purposefully or unknowingly grade calls in ways that are unrelated to their objective quality. Hence individual user opinion scores are noisy due to user bias and random scoring. Therefore, while the process discussed above may give a higher experienced call quality on average across a group of users, predicting individual user opinion scores from technical parameters alone may not always be as accurate as may be desired for any one individual user.

User bias refers to the impact of one or more factors on the perceived or reported call quality. Such factors may include for example the user's geographical location (some users are more forgiving than others depending on their geographic areas and/or cultural inheritance), regular or irregular use of the VoIP product, and the participants and content of a call (a call with one's family is typically perceived as having a higher quality than a call with strangers, while a call with good news is perceived as having a higher quality than a breakup). Random scoring refers to the user's selection of a specific call quality score (typically the highest) irrespective of the underlying technical conditions of the call, e.g. in order to discard additional questionnaires about the technical conditions of the call. Note that, despite its name, the user score selection is not strictly random in this case but rather non-causal (as there is no causal relationship between the technical quality of the call and the resulting user score).

To address the effect of such potential user bias or the like, in embodiments the model is configured to model the quality of user experience in further dependence on one or more user-related parameters indicative of one or more characteristics of the user in question. In embodiments the one or more user-related parameters may comprise any of:

a country or geographic region selected by the user, a country or geographic region the user terminal is detected to be located in, a language selected by the user, a language of a user interface of the client application, and/or a language of a user interface of the user terminal (e.g. culture or local climate may affect expectations or perceived quality);

the age of the user (users of different ages may tend to have different expectations or to have had different amounts of experience with the client product);

a brand of the client application, and/or a brand of the user terminal (brand may affect a user's perception of the product);

an indication of advertisements in the client, and/or an indication of advertisements on the user terminal (adverts may annoy or distract users, leading to a different rating);

length of call (users making longer calls may have a different perception, expectation or tendencies than users only using the client for short calls);

length of a contact list of the user, a length of time the user has participated in a communication system of which the client is a part and over which the modeled calls were made (e.g. the VoIP system in question), a regularity of participation in the system, and/or an amount of prior feedback given by the user (users who participate or engage to a greater degree may have different expectations or tendencies than more casual users); and/or a relation between the user and one or more other participants of the call (e.g. a call with friends or relatives may be perceived differently or have different expectations than a call with a stranger or a work colleague).

For example the model may take into account the user's track record of providing specific call quality ratings, and/or may include only users who have used the VoIP system for a period of time (no new users). As another example, different countries or cultures tend to grade calls with similar technical characteristics using different average grades, and UI language has been found to be a good proxy for a users' background and culture. Similar reasoning can be applied for the contact list size—users who are more active tend to rate calls better and the contact list size is a relatively good proxy for measuring engagement.

Information such as language, contact list length, age or type of participants may be determined for example from settings of the client and/or a profile of the user within the communication system.

Embodiments for accommodating user bias or "random" scoring may be implemented for example by creating separate functions within the model based on separate sets of training data, partitioned according to the one or more user-related parameters, e.g. with different versions of the modeled relationship for different countries or language on the basis that users from different cultures may have different expectations, and/or different versions of the modeled relationship for different lengths of contact list on the basis that users more involved in the communication system tend to score differently than less involved users. That is, the feature space is partitioned into different sub-spaces for a different user characteristics or combinations of such characteristics. When a client application 103 submits its technical parameters to the model 106, it queries only the function or sub-space within the model that relates to its own user characteristics, e.g. only the version of the relationship that applies to the same country, region, language, age range and/or contact list length, etc. The predicted opinion score and call adaptation are then determined based on the submitted technical parameters as applied to that part of the model.

Alternatively the model may be configured to take into account all the technical and non-technical parameters together synergistically, including the user-related parameters in the model together with the technical parameters. I.e. the user-related parameters are included as one or more extra dimensions of the multi-dimensional feature space along with the technical parameters. At the training stage the user-related parameters are input into the model and treated no differently than the technical parameters. Thus when a client application 103 submits its technical parameters to the model 106, it also submits the one or more user-related parameters indicative of one or more characteristics of the user 101 of the client application. The predicted opinion score and call adaptation are then determined based on both the technical and user-related parameters being applied to the model with the user-related parameters being treated in the same way as the technical parameters alongside the technical parameters (except that the user-related parameters cannot be adapted as a result).

Note however that it is not essential to take into account user bias or random scoring in all possible embodiments. When computed over a sufficiently large number of calls, the (objective) mean opinion score predicted from technical parameters alone will still tend not to exhibit the user-noise and bias of the individual call ratings, and can be used to improve experienced call quality on average over a group of calls.

Further Embodiments

It will be appreciated that the above embodiments have been described only by way of example, and that various additions to or variants of the exemplified embodiments are possible.

For instance, in the above the user feedback takes the form of explicit user feedback scores rating the subjective quality of the calls, i.e. scores submitted explicitly by the users themselves such as opinion scores on a scale of one to five stars. However, an alternative would be to replace the feedback of scores with feedback of one or more other metrics correlated with call quality. An example would be call duration—poor quality tends to imply shorter calls in general because, whereas better quality calls tend to go on longer. For example the user may give up on a very bad quality call, and be disinclined to conduct a poor quality call for very long, whilst a good quality call may inspire the user to stay on the line for longer. Such a metric can be used to provide implicit feedback on the quality of a call. Thus instead of asking for opinion scores from the users directly, instead one or more other user quality perception related metrics can be used so that the users are not (necessarily) required to manually input a rating.

Further embodiments, note it is not necessary in all embodiments that the entire model is estimated based on the user feedback. In other embodiments it is possible that part of the model is based on user feedback modeling, while another part may be based on other methods such as a hand-tuned function or table, literature, and/or existing objective quality tests or tools.

In yet further embodiments the model may additionally take into account a-priori parameters of the network and/or receiving terminal in order to set initial parameters of the call. That is, the model may comprise additional functionality modeling call quality based on parameters known or assumed about the network or terminal(s) before the call begins, e.g. one or more potential or theoretical network QoS parameters, and/or one or more potential or theoretical CPU resources of the terminal(s). The client on the receiving terminal can access this function in order to obtain an estimate of one or more initial parameters to begin the call with, e.g. to estimate an initial resolution and/or frame rate.

Generally, any of the functions described herein can be implemented using software, firmware, hardware (e.g. fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described herein are platform-independent, meaning that the techniques may be implemented on a variety of commercial computing platforms having a variety of processors.

For example, the terminals and/or server may include an entity (e.g. software) that causes hardware of the terminals to perform operations, e.g., processors functional blocks, and so on. For example, the terminals and/or server may include a computer-readable medium that may be configured to maintain instructions that cause the terminals, and more particularly the operating system and associated hardware of the terminals to perform operations. Thus, the instructions function to configure the operating system and associated hardware to perform the operations and in this way result in transformation of the operating system and associated hardware to perform functions. The instructions may be provided by the computer-readable medium to the terminals and/or server through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A communication client application embodied on a computer-readable medium and configured so as when executed on a user terminal to perform operations comprising:
   conducting at least a first call over a network; and
   accessing a model which models quality of user experience for calls based on a set of technical parameters of each call, the model being based on user feedback indicating subjective quality of multiple past calls as experienced by multiple users, modeled with respect to the technical parameters collected from each of the past calls;
   wherein the model generates a predicted call quality score predicting a quality of user experience for the first call while the first call is ongoing, based on the model applied to the technical parameters of the first call; and
   the communication client application is configured to continue the first call with one or more of the technical parameters of the first call being adapted while the first call is ongoing based on the generation of the predicted call quality score for the first call.

2. The communication client application of claim 1, configured so as when executed on the user terminal to perform further operations of:
   receiving user feedback for the first call from a user of the user terminal, and submitting the user feedback for the first call to the model where the user feedback and technical parameters of the first call are incorporated to adapt the model; and
   conducting a second call over the network;
   wherein the model generates a predicted call quality score predicting the quality of user experience for the second call, based on the adapted model applied to the technical parameters of the second call; and
   the communication client application is configured to continue the second call with one or more of the technical parameters of the second call being adapted based on the generation of the predicted call quality score for the second call.

3. The communication client of claim 1, wherein the model is implemented on a server and the communication client is configured to access the model over the network.

4. The communication client of claim 1, wherein the model is implemented on the user terminal.

5. The communication client of claim 1, wherein the set of technical parameters of each call comprises any of:
   one or more parameters relating to an environment from which the call is being captured,
   one or more parameters relating to capture of call media of the call,
   one or more parameters relating to media content of the call,
   one or more parameters relating to encoding and/or decoding of the call,
   one or more parameters relating to quality of service for the call over the network,
   one or more parameters relating to play-out of call media of the call, and/or
   one or more parameters relating to processing resources of a transmitting and/or receiving terminal of the call.

6. The communication client of claim 1, wherein at least some of said calls are video calls, and at least one of the set of technical parameters of each video call relates to video of the call.

7. The communication client of claim 6, wherein at least one of the technical parameters of each video call relates to audio of the call.

8. The communication client of claim 1, wherein the model models said quality of user experience in further dependence on one or more user-related parameters being characteristic of a user of said user terminal.

9. The communication client of claim 8, wherein the one or more user-related parameters comprise any of:
   a country or geographic region selected by the user,
   a country or geographic region the user terminal is detected to be located in,
   a language selected by the user,
   a language of a user interface of the client application,
   a language of a user interface of the user terminal,
   age of the user,
   a brand of the client application,
   a brand of the user terminal,
   an indication of advertisements in the client,
   an indication of advertisements on the user terminal,
   length of call,
   length of a contact list of the user,
   a length of time the user has participated in a communication system over which the calls are made,
   a regularity with which the user has participated in the communication system,
   an amount of prior feedback given by the user, and/or
   a relationship between the user and one or more other participants of the respective call.

10. The communication client of claim 1, wherein the model provides additional functionality modeling call quality based on one or more a-priori parameters of the network and/or user terminal, and the client is configured to access the additional functionality of the model in order to begin the first call with one or more of the technical parameters of the first call being initially set based on said additional functionality.

11. The communication client of claim 1, wherein the user feedback upon which the model is based comprises explicit user feedback scores rating the subjective quality of the multiple past calls as experienced by the multiple users.

12. The communication client of claim 11, wherein each of the user feedback scores is a score out of five.

13. The communication client of claim 1, wherein the user feedback upon which the model is based comprises implicit feedback derived from at least one metric correlated with the quality of user experience.

14. The communication client of claim 13, wherein the metric correlated with user experience is call length.

15. The communication client of claim 1, wherein the model is based on clustering the user feedback scores into multi-dimensional cells, each cell being associated with a respective range of each of the set of technical parameters.

16. The communication client of claim 1, wherein the model is based on the technical parameters and one or more model parameters of the model itself, the model being based on a training of the model parameters by a training algorithm.

17. A user terminal comprising and being arranged to execute the communication client application of claim 1.

18. A communication system comprising the user terminal of claim 17 and the model.

19. A server comprising:
a model configured to model quality of user experience for calls based on a set of technical parameters of each call, the model being based on user feedback indicating subjective quality of multiple past calls as experienced by multiple users, modeled with respect to the technical parameters collected from each of the past calls;
a network interface arranged to receive further user feedback indicating the subjective quality of a plurality of further calls from a plurality of users, and to receive the technical parameters of the further calls;
wherein the model is configured to dynamically incorporate the user feedback and the technical parameters of the further calls and thereby dynamically adapt the model each time the further user feedback is received.

20. A method of modeling quality of user experience for calls conducted over a network, wherein each call is associated with a set of technical parameters; the method comprising:
obtaining multiple user feedback scores, each rating subjective quality of a respective one of multiple calls experienced by multiple users;
modeling the user feedback scores in relation to the technical parameters of each of the respective calls, thereby generating a model for predicting quality of user experience;
obtaining the technical parameters of one or more first subsequent calls;
applying the model to the technical parameters of the first subsequent calls to determine a predicted call quality score predicting the quality of user experience for each of the first subsequent calls;
adapting the first subsequent calls based on the predicted call quality scores of the first subsequent calls while the first subsequent calls are ongoing;
receiving, over the network, user feedback scores for the first subsequent calls from the respective client applications;
adapting said model by incorporating the user feedback scores and technical parameters of the first subsequent calls, thereby producing an adapted model;
obtaining the technical parameters of one or more second subsequent calls;
applying the adapted model to the technical parameters of the second subsequent calls to determine a predicted call quality score predicting the quality of user experience for each of the second subsequent calls; and
adapting the second subsequent calls based on the call quality scores of the second subsequent calls while the second subsequent calls are ongoing.

* * * * *